United States Patent [19]
Kou et al.

[11] Patent Number: 5,978,862
[45] Date of Patent: Nov. 2, 1999

[54] PCMCIA CARD DYNAMICALLY CONFIGURED IN FIRST MODE TO PROGRAM FPGA CONTROLLING APPLICATION SPECIFIC CIRCUIT AND IN SECOND MODE TO OPERATE AS AN I/O DEVICE

[75] Inventors: James Kou, Corona; Juliana Koo, San Dimas, both of Calif.

[73] Assignee: Toshiba America Information Systems, Inc., Irvine, Calif.

[21] Appl. No.: 08/907,509

[22] Filed: Aug. 8, 1997

[51] Int. Cl.⁶ .................................................. G06F 13/10
[52] U.S. Cl. .................................. 710/14; 710/9; 713/100
[58] Field of Search .............................. 712/229; 710/14, 710/9; 713/2, 100

[56] References Cited

U.S. PATENT DOCUMENTS

| | | | |
|---|---|---|---|
| 5,038,320 | 8/1991 | Heath et al. ............................ | 710/10 |
| 5,319,751 | 6/1994 | Garney .................................... | 711/115 |
| 5,535,342 | 7/1996 | Taylor ..................................... | 710/127 |
| 5,537,558 | 7/1996 | Fletcher et al. ......................... | 710/129 |
| 5,537,654 | 7/1996 | Bedingfield et al. .................... | 710/14 |
| 5,564,055 | 10/1996 | Asnashari et al. ..................... | 713/1 |
| 5,572,683 | 11/1996 | Epolite et al. .......................... | 710/104 |
| 5,628,028 | 5/1997 | Michelson ............................... | 710/8 |
| 5,638,530 | 6/1997 | Pawate et al. .......................... | 711/115 |
| 5,671,374 | 9/1997 | Postman et al. ........................ | 710/129 |
| 5,692,159 | 11/1997 | Shand ...................................... | 395/500 |
| 5,737,766 | 4/1998 | Tan ......................................... | 711/170 |
| 5,745,268 | 4/1998 | Eastvold et al. ........................ | 359/110 |
| 5,760,607 | 6/1998 | Leeds et al. ............................ | 326/38 |
| 5,838,664 | 11/1998 | Polomski ................................ | 370/263 |

OTHER PUBLICATIONS

Clark Westmont et al., Reprogrammability Eases PCMCIA Designs, Apr. 18, 1994, "Computer Systems Special Editorial Feature", pp. 110–113.

Primary Examiner—Thomas C. Lee
Assistant Examiner—Ilwoo Park
Attorney, Agent, or Firm—Banner & Witcoff, Ltd.

[57] ABSTRACT

An apparatus and method for dynamically configuring a PCMCIA compatible card permits new or modified configuration parameters to be loaded into an FPGA on the card. In accordance with the invention, the PCMCIA card is initially configured to operate as a memory device. While in this mode, an FPGA on the card is loaded from a host computer using memory write commands through the PCMCIA interface. Thereafter, the card is reconfigured to operate as an I/O device using the FPGA code newly loaded on the card. The invention permits new PCMCIA card designs to be quickly changed and tested by downloading code into the FPGA and operating the card as an I/O device. The nonvolatile nature of an FPGA permits the card to retain its new or modified functions even after it has been powered down. Moreover, the invention permits code changes to be made dynamically without powering down the computer.

14 Claims, 7 Drawing Sheets

PCMCIA CARD DYNAMICALLY CONFIGURED IN FIRST MODE TO PROGRAM FPGA CONTROLLING APPLICATION SPECIFIC CIRCUIT AND IN SECOND MODE TO OPERATE AS AN I/O DEVICE

BACKGROUND OF THE INVENTION

1. Technical Field

This invention relates generally to an apparatus and method for dynamically configuring a PCMCIA compatible device. More particularly, the invention provides an easy method of loading new or modified configuration parameters into a PCMCIA peripheral controller such as a tape controller for a notebook computer.

2. Related Information

Personal Computer Memory Card International Association (PCMCIA) compatible devices such as modems, memory modules, and disk controllers are well known. The PCMCIA interface defines a physical size and electrical interconnection for a class of computer peripherals. The size of each PCMCIA device is approximately that of a credit card, and each device connects mechanically and electrically through a standard connector to a host computer such as a notebook PC. The small size is a major advantage for small computer footprints. The PCMCIA standard has recently become referred to as the "PC card" standard.

The PC card standard provides physical specifications for 3 types of PC cards, all having the same length and width and using the same 68-pin connector. However, the 3 types (type I, type II, and type III) have a different thickness. The card types have features that fit the needs of different applications. Type I cards are typically used for memory devices such as RAM, flash, and SRAM cards. Type II cards are typically used for I/O devices such as data/fax modems, LANs, and mass storage devices. Type III cards are typically used for devices having thicker components, such as a rotating mass storage device. Although the initial PC card standard in 1990 defined only memory cards, later versions of the standard added I/O cards as a different device type.

The PC card standard also defines a software architecture to provide "plug and play" capability across a range of products. For example, host software known as "socket services" is a BIOS level interface that masks the hardware implementation from card vendors' driver (i.e., it avoids requiring that the card driver communicate directly with any particular chip). Similarly, software referred to as "card services" manages system resources such as interrupt assignment and memory windows for PC cards.

PCMCIA compatible peripherals can require large development costs and long development schedules. For example, complex circuits are typically required to squeeze a large number of functions into a small space, and specialized hardware and software is often required to interact with a peripheral accessed through the PC card interface.

When designing a PCMCIA tape or disk controller, for example, a design engineer must develop circuitry to perform logic functions which implement the complex interaction and error checking for a particular disk or tape unit, and also interfacing protocols to the host computer. Once developed and implemented, making changes to the design of such a device can be expensive and time consuming because the hardware must be redesigned and remanufactured. For example, making a minor change to the protocol between the PCMCIA device and the host computer can require weeks or months and thousands of dollars. Accordingly, there is a need for a faster and cheaper method of testing new PCMCIA compatible devices.

SUMMARY OF THE INVENTION

The present invention overcomes many problems inherent in designing new PCMCIA compatible devices by providing a method and apparatus for dynamically downloading new or modified device functions into the device. According to one aspect of the invention, a PCMCIA compatible device is inserted into a host computer such as notebook PC. The PCMCIA device is first configured to operate as a memory device, and function code is downloaded into a field programmable gate array (FPGA) in the device by treating the device as a memory type PC card. Thereafter, the device is reconfigured to operate as an I/O type device, and the host computer interacts with the newly downloaded function code resident on the device.

The nonvolatile nature of an FPGA permits the device to retain its new or modified functions even after it has been powered down. Moreover, the FPGA permits code changes to be made dynamically without powering down the computer. Many functions normally performed in an ASIC can be provided in a FPGA which can be quickly and easily modified from a host computer.

Additional features and advantages of the invention will become apparent through the following description, the figures, and the appended claims.

DETAILED DESCRIPTION OF THE PREFERRED EMBODIMENTS

Figure 1:
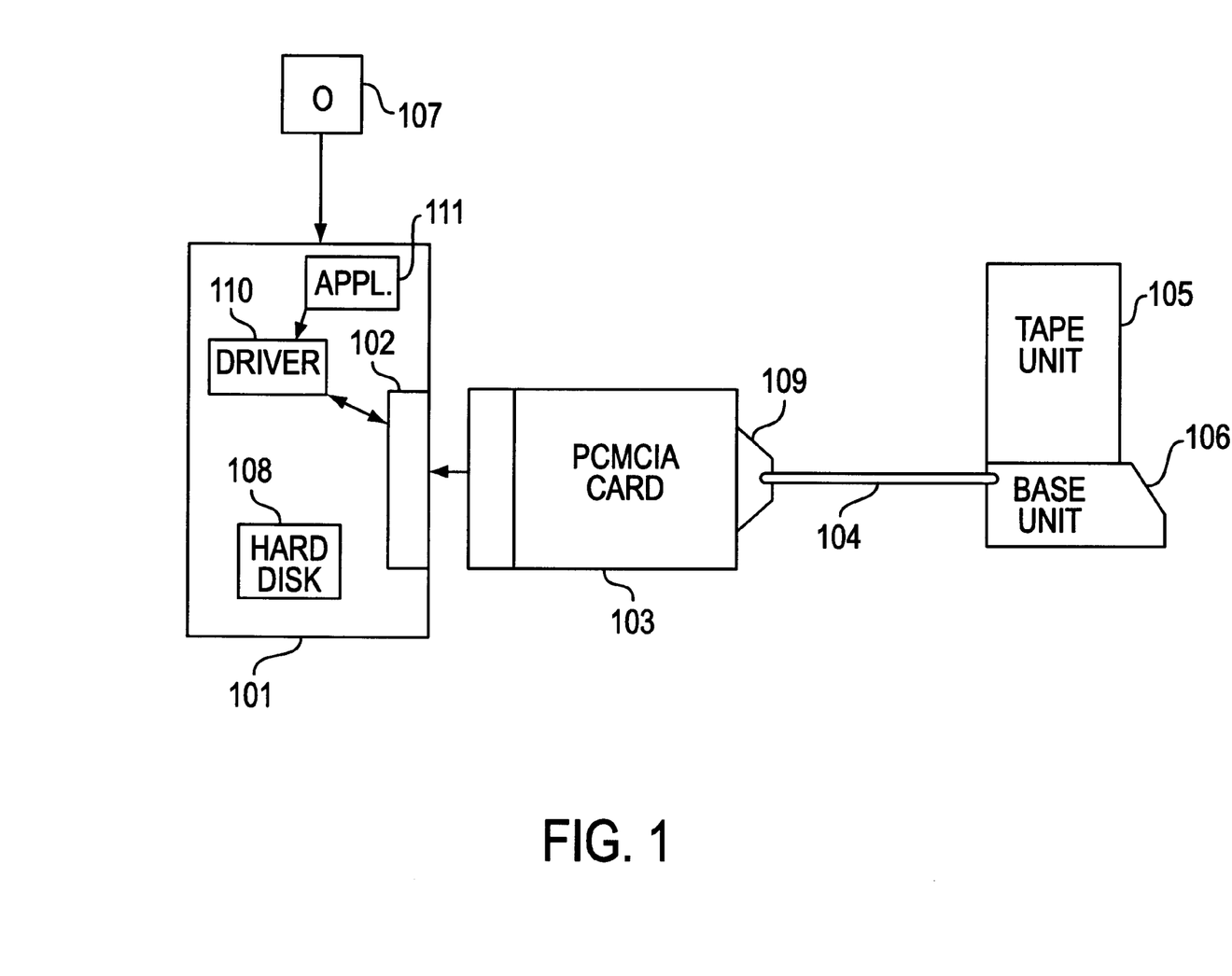
FIG. 1 shows a system employing a reconfigurable PCMCIA card which interfaces to a tape unit in accordance with one aspect of the invention.

FIG. 1 shows a system employing a PCMCIA device 103 in accordance with one aspect of the invention. As shown, the system includes a host computer 101 having a PCMCIA compatible socket 102 into which a PCMCIA card 103 can be inserted. Host computer 101 can comprise a notebook computer, for example, and can access data from a removable storage medium such as a floppy disk 107 and a hard disk 108. In one embodiment, a software driver 110 can be used to implement certain functions to interact with PCMCIA card 103 through socket 102. Driver 110 can be loaded by an application program 111, which can also implement certain other functions (e.g., a user interface).

PCMCIA card 103 includes various hardware and software functions for interfacing host computer 101 to an I/O device such as a tape unit 105. As shown, PCMCIA card 103 is coupled to tape unit 105 through a cable 104 and a base unit 106 which may provide a power source to the tape unit 105. The power source may comprise a small battery, for example. In one embodiment, PCMCIA card 103 communicates with tape unit 105 through a parallel port 109. A second parallel port can be used for communicating with the PCMCIA card through socket 102.

As described in more detail herein, PCMCIA card 103 is first configured to operate as a memory PCMCIA device. In this mode, host computer 101 transfers hardware functions in the form of field programmable gate array (FPGA) instructions into the card using memory read/write instructions. Thereafter, PCMCIA card 103 is reconfigured to operate as an I/O type device, and host computer 101 interacts with card 103 using I/O instructions. As one example, PCMCIA card 103 can be configured to interface with a tape mass storage unit.

Figure 2:
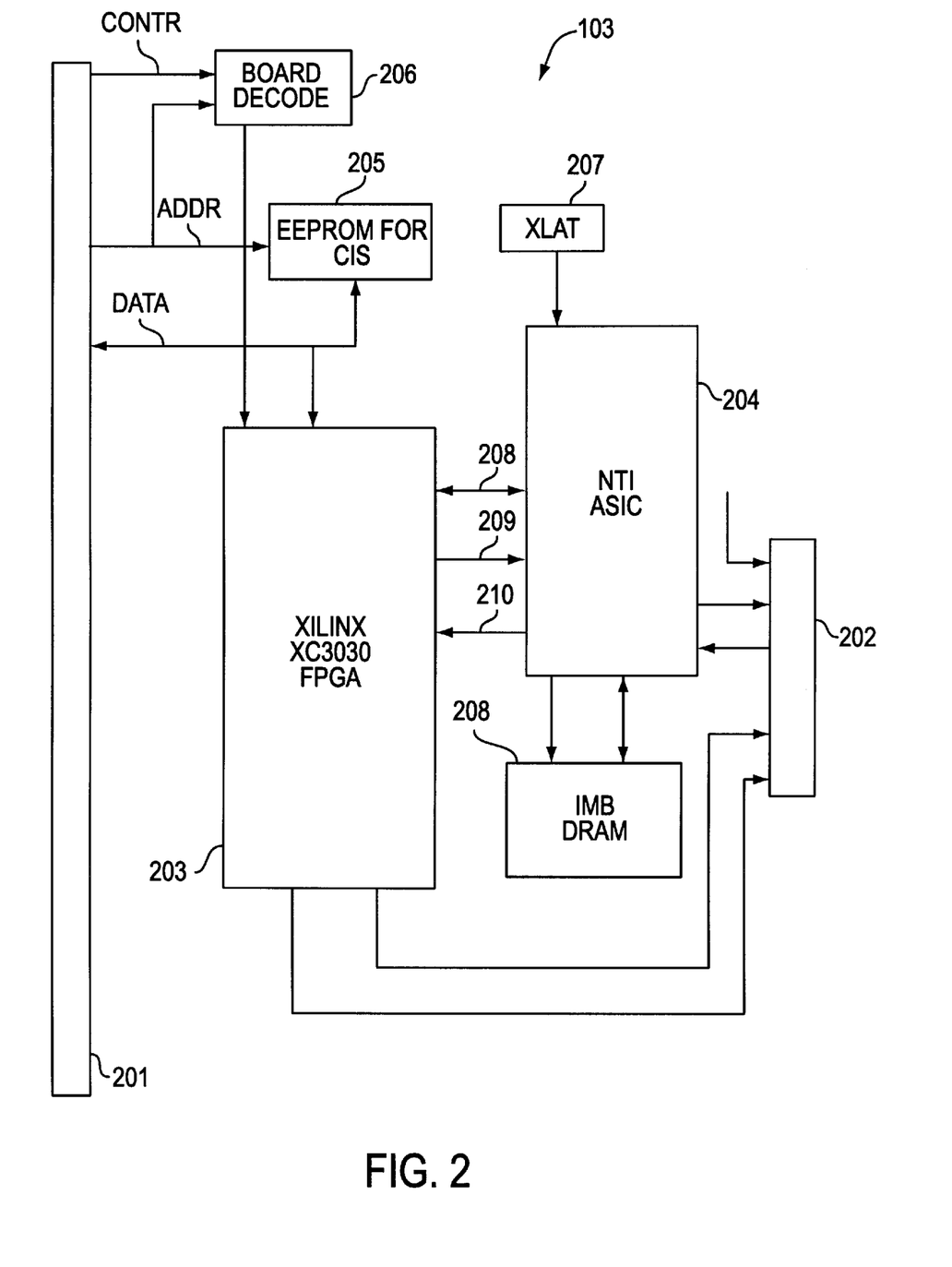
FIG. 2 shows one possible embodiment for a PCMCIA card according to the present invention.

FIG. 2 shows one possible embodiment for a PCMCIA card according to the present invention. A PCMCIA compatible connector 201 provides a standard PCMCIA interface which mates with socket 102 of FIG. 1. An I/O device connector 202 may comprise a PC/TXE 15 pin connector which interfaces to tape unit 105 of FIG. 1 through a cable. A field programmable gate array (FPGA) 203, which may for example, comprise a Xilinx XC3030, is coupled between connector 201, connector 202, and an application-specific integrated circuit (ASIC) 204.

In general, FPGA 203 can be dynamically programmed with new hardware functions through connector 201 in a first mode, and then can be used to execute the hardware functions in a second mode. ASIC 204 includes application-specific circuits which control tape unit 105 of FIG. 1.

The PCMCIA device of FIG. 2 also includes a memory 208 which may comprise a 1 Mb DRAM, a translation circuit 207, an EEPROM 205 for storing card information structure (CIS) data, and a board decoder 206. Appropriate control, address and data lines as shown can be used to connect the aforementioned components. Additionally, a parallel port data bus 208, control lines 209, and status signal lines 210 can be used to interface the FPGA to ASIC 204.

As is conventional, a PCMCIA standard data structure known as Card Information Structure (CIS) is stored in nonvolatile memory, preferably in EEPROM 205. Board decoder 206 can be used in one embodiment to set pointers to one of a plurality of CIS "tuples", described in more detail herein, in order to support both a memory mode and an I/O device mode. The default CIS is a memory device (i.e., the PCMCIA card is treated as a memory card). In one embodiment, data bus DATA includes 16 bits, 2 bits of which are used as clock and data lines used to write instructions into FPGA 203.

The particular arrangement and ASIC implementation will of course be dictated by the particular I/O application desired. In one embodiment, a Datasonic tape unit may be used.

Conventional "plug-and-play" PCMCIA cards conform to a standard protocol which allows a PC to exchange information with the card. Typically, PCMCIA cards are configured to operate either as a memory device or as an I/O device, and the cards return data to the PC indicating the type of card and interfacing details. Memory-type cards are simpler to interface with, since I/O-type cards typically require that the host PC allocate resources such as memory and interrupt services.

According to the present invention, a single PCMCIA card is first configured as a memory device in order to load FPGA instructions into the FPGA. Thereafter, the same PCMCIA card is configured to operate as an I/O device.

Figure 3:
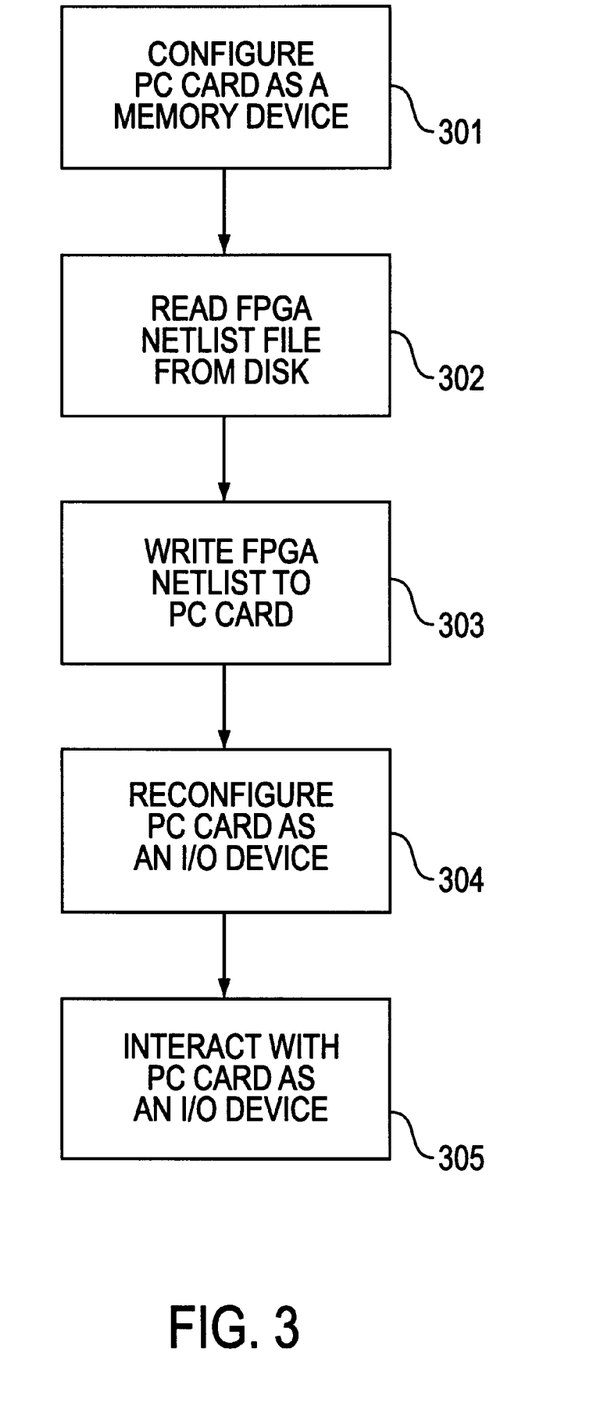
FIG. 3 shows in simplified form steps for configuring a PCMCIA card as a memory device in order to load FPGA instructions, then reconfiguring the card as an I/O device.

FIG. 3 shows in simplified form steps for configuring a PCMCIA card as a memory device in order to load FPGA instructions, then reconfiguring the card as an I/O device. Beginning with step 301, the PC card is initially configured to interact with the host computer as a memory device (i.e., memory read and write instructions are used to read from and write to the card). This can be done by establishing a default card information structure (CIS) in the card which informs the host computer that the card is a memory type device. Next, in step 302, an FPGA netlist file to be loaded into the FPGA in the device is read from a disk, such as a floppy disk or hard disk drive. Programs used for creating FPGA netlists are well known and are not discussed here. Thereafter, in step 303, the FPGA netlist is written into the FPGA using memory write commands. In various embodiments, this can be performed by using one bit of data bus DATA as a clock signal and using another bit of data bus DATA as a data signal.

After the netlist has been written into the FPGA, then in step 304 the PC card is reconfigured to operate as an I/O device (i.e., it accepts I/O instructions from the host computer, the host computer allocates I/O resources, etc.). This can be accomplished by using board decoder 206 to switch the CIS "tuple" in EEPROM 205 to one which supports an I/O device, causing the new tuple to be read into the host computer, and allocating resources for the I/O device. Thereafter, in step 305, the host computer interacts with the PC card as an I/O device such as a tape storage unit or the like.

Figure 4A:
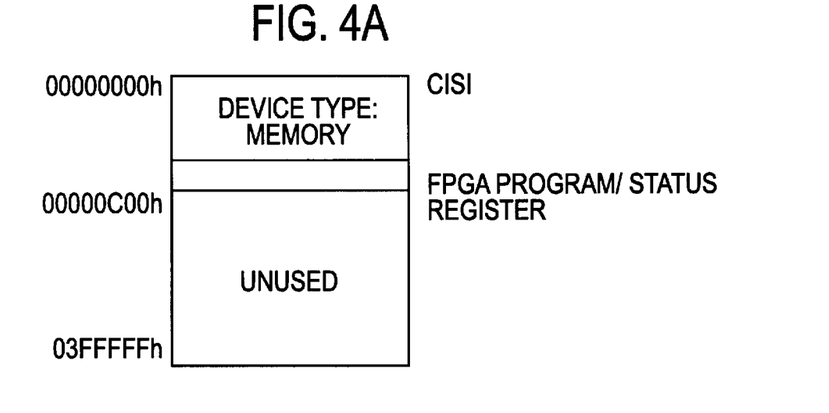
FIG. 4A shows a first attribute memory map for communicating with a PCMCIA card as a memory device.
Figure 4B:
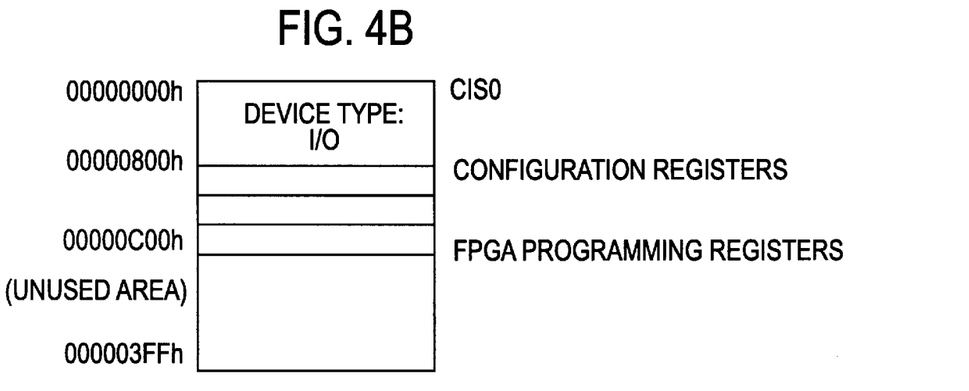
FIG. 4B shows a second attribute memory map for communicating with a PCMCIA card as an I/O device.
Figure 4C:
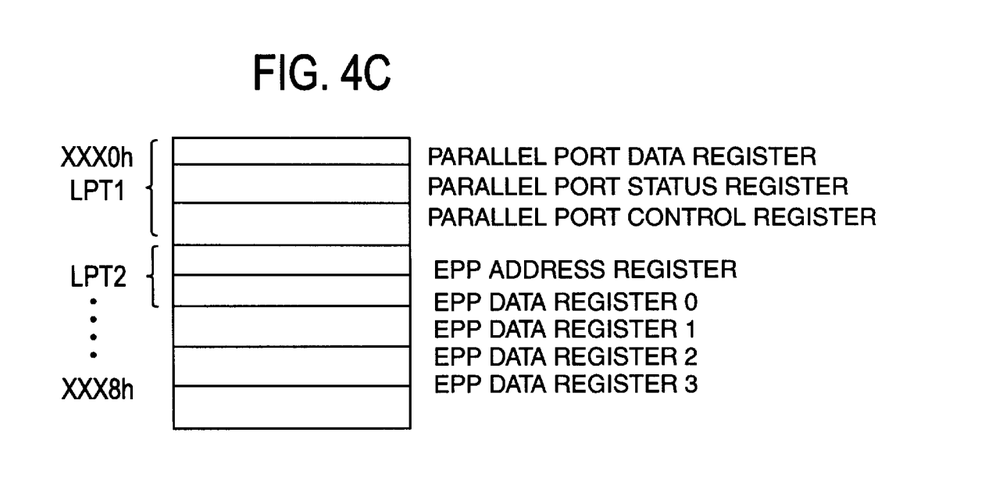
FIG. 4C shows an I/O address map for communicating with a PCMCIA card as an I/O device.

FIGS. 4A through 4C provide details of attribute memory maps and an I/O address map which can be used to configure a PC card first as a memory device and then as an I/O device. FIG. 4A shows a first attribute memory map for communicating with a PCMCIA card as a memory device. FIG. 4B shows a second attribute memory map for communicating with a PCMCIA card as an I/O device. FIG. 4C shows an I/O address map for communicating with a PCMCIA card as an I/O device.

Beginning with FIG. 4A, it is assumed that an attribute memory map including information shown in FIG. 4A has been previously programmed into EEPROM 205 of FIG. 2, typically starting at address 00000000 hex. In relevant part, this memory map includes a card information structure (CIS) "tuple" CIS1 which indicates that the card type is a memory device. When the host computer initializes the card, this tuple is returned to the host, which determines that the device is a memory device and treats it as such.

It is preferable that the CIS1 indicate that the card has a memory address range, but that it is not a standard type of memory in order to prevent the memory resource manager from trying to attach to the card. When the card is in this state, it will respond to read and write operations in the common memory to program the FPGA.

CIS memory is aliased every 1000h in memory to save on decoding logic. The memory is accessed as 8 bit quantities at even addresses only. This convention is required by the PCMCIA specification to support 8 bit hosts. This means that while the linear memory space is 400h it occupies 800h of address space. In order to perform a write operation, the software must wait a short period of time between each write. To determine when it is safe to write to the next location, the driver polls the last location written. The data read will be inverted relative to what was written until the internal write cycle has been completed.

FIG. 4B shows a second attribute memory map including a second CIS tuple CIS0 which indicates that the device is an I/O device. It is assumed that this second CIS tuple was also previously programmed into EEPROM 205, but beginning at a later address. However, in accordance with one aspect of the invention, board decoder 206 causes FPGA 203 to change a memory map associated with this memory such that the host computer perceives the CIS0 tuple to be the default tuple at address 00000000h. That is, when the host computer interrogates the card, the memory map shown in FIG. 4B is returned to the host, causing the host to treat the card as an I/O device.

FIG. 4C shows an I/O address map which is visible after initialization as an I/0 device. For example, a first parallel port LPT1 can be located at the first address, and a second parallel port LPT2 can be located at a subsequent location, etc. Once the FPGA has been programmed, the card programming model changes to use the I/O address space and attribute memory space; the common memory space is no longer used. Once the configuration register is configured, the card becomes an I/O address mapped parallel port card. The parallel port registers are all contained in the I/O address space and allow application software to communicate with the device (e.g., tape unit) via the normal parallel port control and data registers.

Figure 5A:
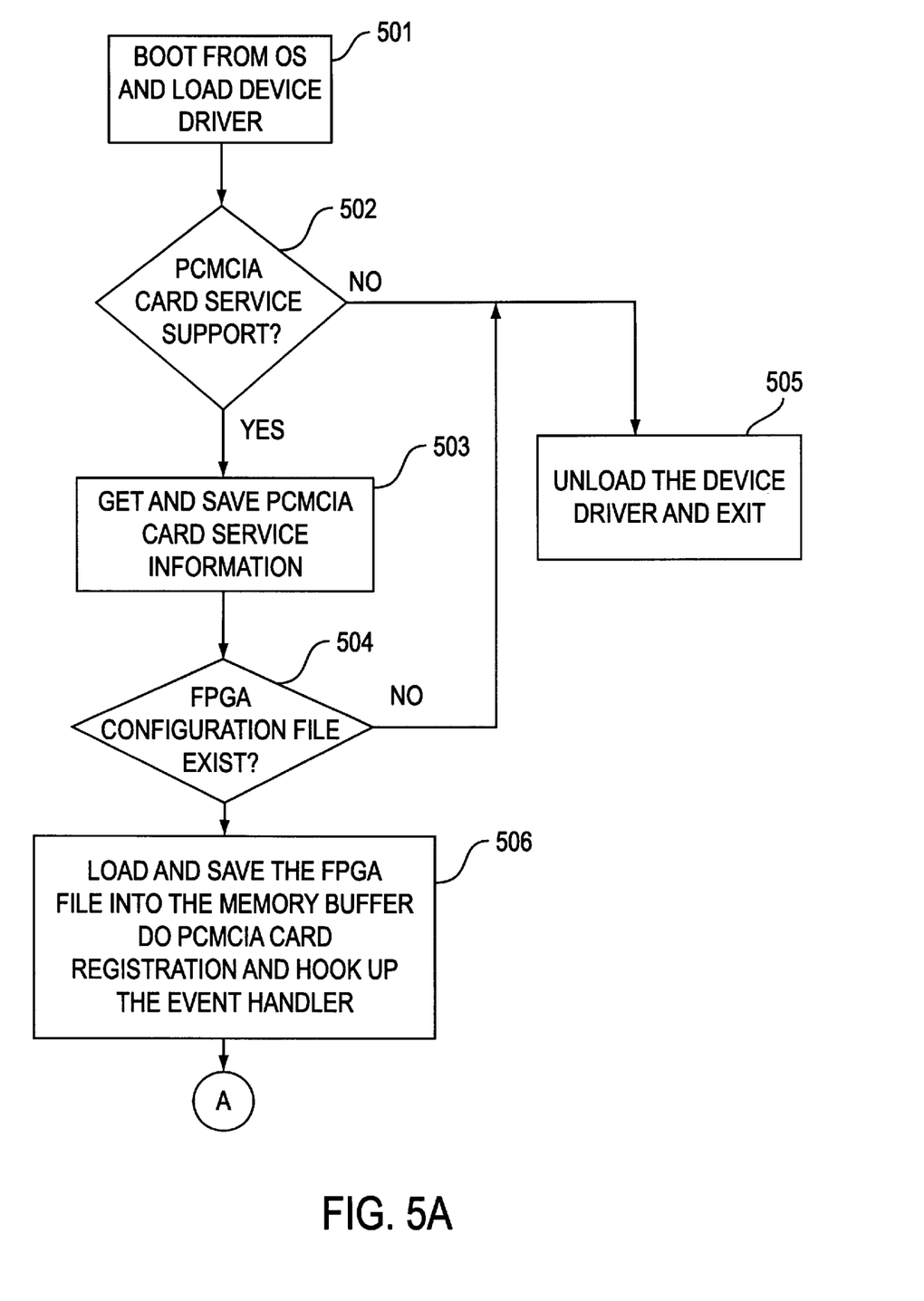
FIG. 5A is a first flow chart illustrating steps which can be carried out in accordance with one embodiment of the present invention.

FIG. 5A is a first flow chart illustrating steps which can be carried out in accordance with one embodiment of the present invention. These steps generally provide additional detail to those shown in FIG. 3, and can be implemented in driver 110 and application 111 of FIG. 1.

Beginning in step 501, the host computer is booted, and a device driver which implements the functions described herein is loaded. In step 502, a test is performed to see whether the operating system supports PCMCIA card services. If not, then in step 505 the device driver is unloaded and the program exits.

In step 503, the PCMCIA card service information is retrieved and saved. In step 504, a test is made to determine whether an FPGA configuration file exists for loading the FPGA. If none exists, then termination occurs at step 505.

In step 506, the FPGA file is retrieved from a disk and stored in memory. Additionally, PCMCIA card registration occurs, and the event handler is hooked up. These generally include steps of allocating resources for the card, calling card services to register the card, and hooking up an event handler to handle power management, insertion, and removal events. Handling of these events is shown in steps 513 through 518, which are not explained further. Processing then advances to step 507 (see FIG. 5B).

Figure 5B:
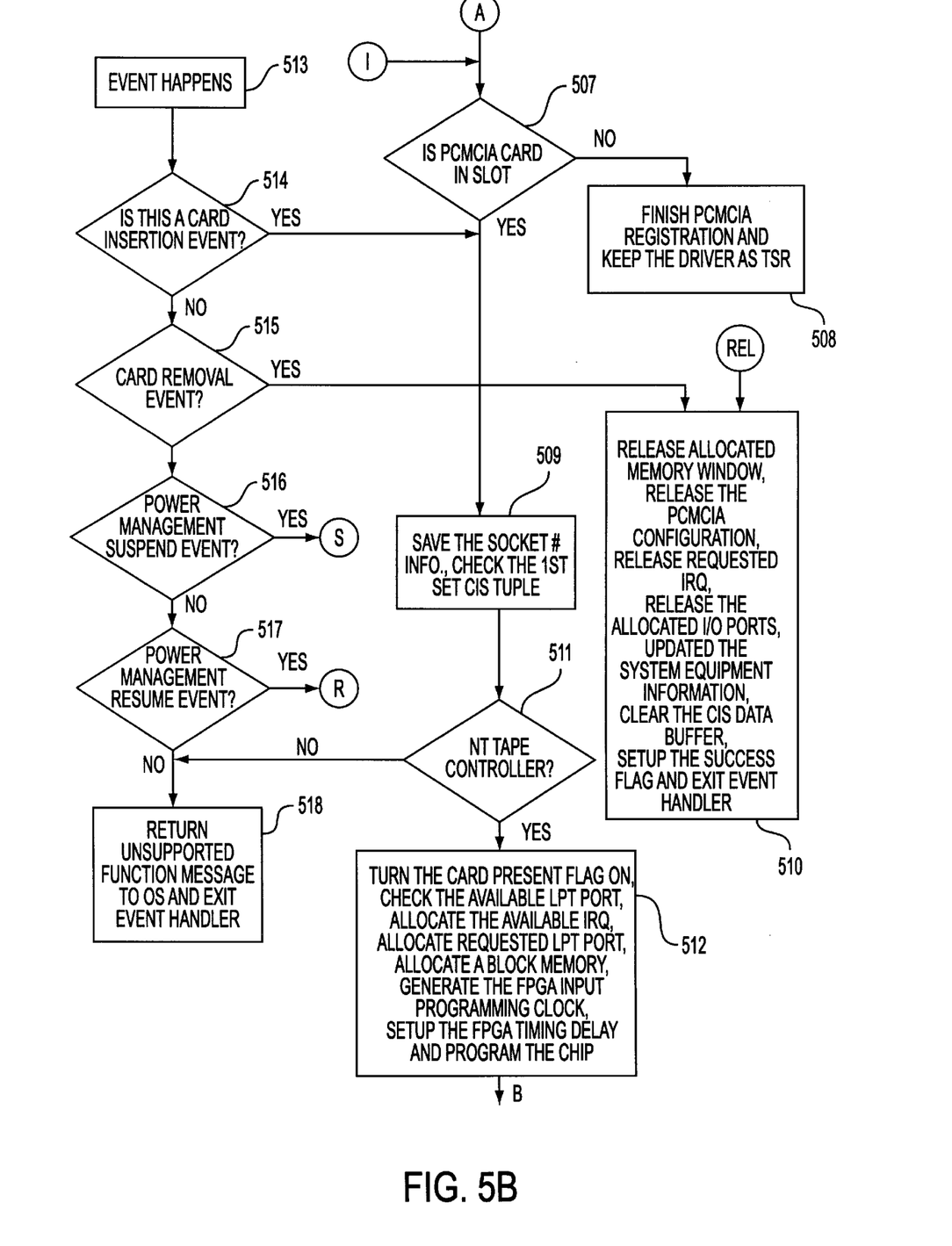
FIG. 5B is a continuation of the flow chart of FIG. 5A.

In FIG. 5B, in step 507 a test is performed to see whether there is a card in the slot. If not, then in step 508 the card registration is completed and the driver is retained as a TSR (terminate and stay resident). Otherwise, processing advances to step 509.

In step 509, the socket number information is saved, and the first CIS tuple is checked from the card (i.e., CIS1 shown in FIG. 4A). In step 511, a test is made to determine whether a special type of string has been inserted into the CIS consistent with the type of device contemplated by the invention. For example, if the card has been configured to support a tape controller, a string such as "NT tape" can be stored in the CIS1 to indicate this condition. The driver detects this string and, if present, proceeds with the configuration. Otherwise, termination occurs in step 518.

In step 512, programming of the FPGA in the card occurs. This includes steps of setting a "card present" flag in the driver, finding an available LPT port and configuring a tape port as a parallel port (avoiding conflicts with other ports), allocating an IRQ for the port, and allocating a block of memory to program the FPGA chip. Additionally, an FPGA programming clock is generated, and an FPGA timing delay is established (used to ensure that the chip is ready). Finally, the FPGA chip itself is programmed.

One approach for programming the FPGA chip is to use one of the data lines (DATA in FIG. 2) as a clock and another of the data lines for the programming data. As is well known, a hardware schematic can be converted into an FPGA netlist which is a file that configures the FPGA to perform specific hardware functions. If the hardware schematic is changed, a new netlist can be quickly generated for loading into the FPGA, thus saving valuable design time. The FPGA netlist data itself is ready out of memory by the driver and written, one bit at a time, into the FPGA through one of the data lines DATA in FIG. 2. As explained previously, FPGA netlist generation programs are well known and are not elaborated upon here. As one example, Xilinx provides an off-the-shelf program for creating netlists for its FPGA chip. Other vendors include Viewlogic and Mentor Graphics. After programming, the process advances to step 519 of FIG. 5C.

Figure 5C:
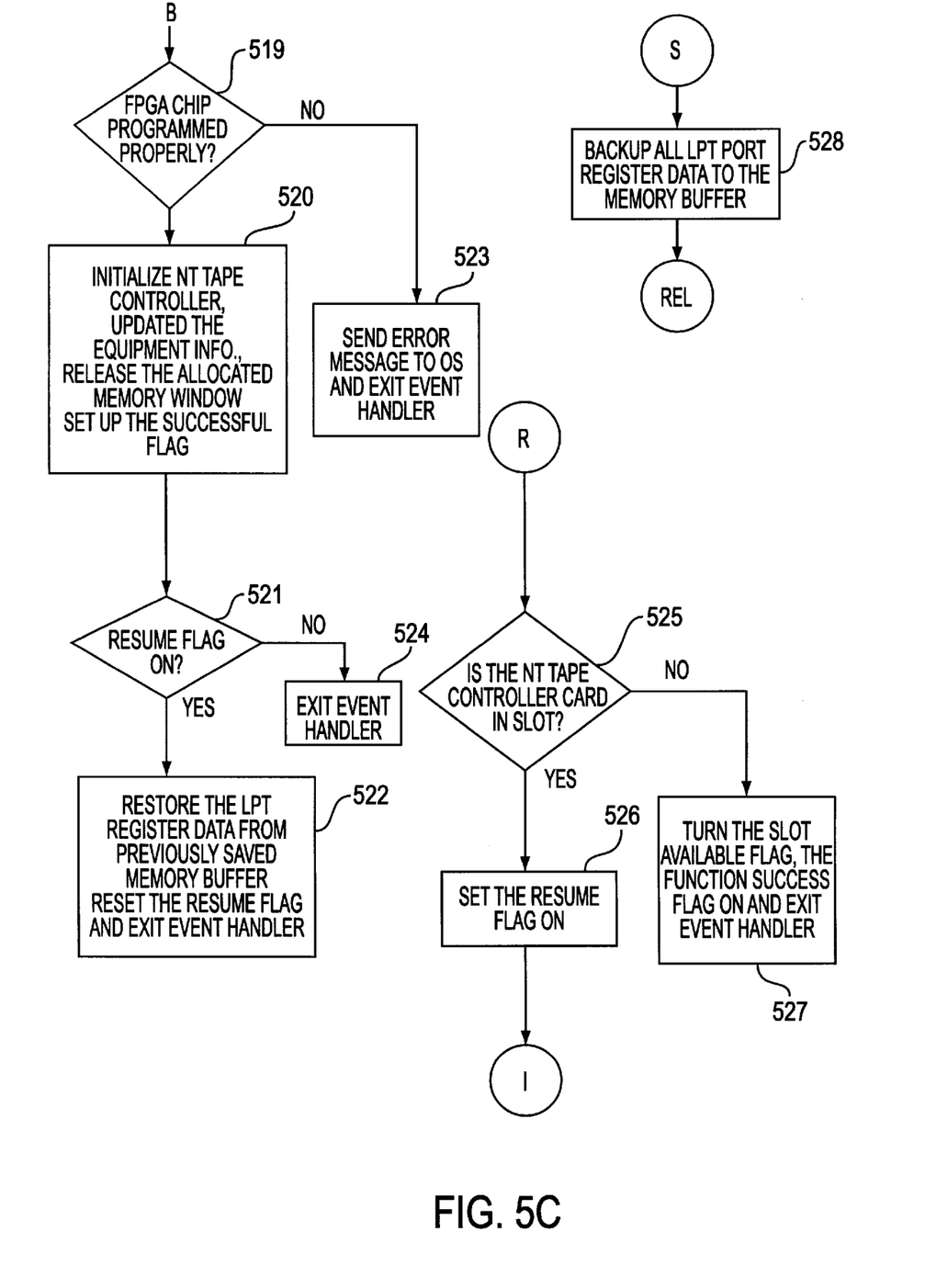
FIG. 5C is a continuation of the flow chart of FIG. 5B.

In FIG. 5C at step 519, a test is made to determine whether the chip has been properly programmed. As one example, various diagnostic tests can be performed by writing information to FPGA program registers (see FIG. 4A) and checking the result. If an error exists, then in step 523 an error message is generated and the event handler exits.

Next, in step 520, the I/O device (e.g., a tape controller) is initialized. This can be implemented by generating a signal to board decoder 206, which causes FPGA 203 to change a memory map to CIS0 (see FIG. 4B), thus causing the host computer to treat the card as an I/O device. The driver uses the new address window, and configures the controller as an I/O device. The allocated memory window is released, and a success flag is set.

Thereafter, in step 521 a check is made to determine whether a resume flag is set. This might occur if the unit was turned off during a tape backup, for example. If set, the LPT register data must be restored, and the resume flag is reset. If the flag was not set, termination occurs in step 524.

Processing in steps 525 through 527 (entry point "R") corresponds to a power management resume event from step 517 of FIG. 5B. Processing in step 528 (entry point "S") corresponds to a power management suspend event from step 516 of FIG. 5B. Handling of power management events is an optional feature of the present invention.

Thus has been described a system and method for configuring a PCMCIA compatible card as a memory device for the purpose of programming an FPGA on the card and then configuring the card as an I/O device using the newly programmed FPGA. It is apparent that many modifications and variations of the present invention are possible, and references to specific values are by example only. The method steps of the invention may be practiced in a different ordered sequence from that illustrated without departing from the scope of the invention. It is, therefore, to be understood that within the scope of the appended claims the invention may be practiced otherwise than as specifically described.

We claim:

1. A PCMCIA card for insertion into a host computer comprising:

a PCMCIA connector;

a nonvolatile memory, coupled to the PCMCIA connector and programmed with a first group of card information structure (CIS) data which defines the PCMCIA card as a memory device and a second group of CIS data which defines the PCMCIA card as an I/O device;

an application-specific circuit which interfaces with a peripheral device; and a field programmable gate array (FPGA) coupled to the PCMCIA connector, to the nonvolatile memory, and to the application specific circuit, wherein the FPGA is programmable through the PCMCIA connector with code which controls the application specific circuit;

wherein the PCMCIA card is operable in a first mode in which the FPGA is programmed using the first group of CIS data through the PCMCIA connector from the host computer, and a second mode in which code programmed into the FPGA is used to operate the PCMCIA card using the second group of CIS data as an I/O device to interact with the peripheral device.

2. The PCMCIA card of claim 1, wherein the second mode comprises a mode in which the PCMCIA card is operated as a tape controller, and wherein the peripheral device comprises a tape storage unit.

3. The PCMCIA card of claim 2, wherein the FPGA and the application specific circuit are coupled to the peripheral device through an external connector other than the PCMCIA connector.

4. The PCMCIA card of claim 1, further comprising a board decoder circuit coupled to the PCMCIA connector and to the FPGA, wherein the board decoder circuit receives control signals from the host computer and in response thereto causes the FPGA to change a memory map, causing the host computer to use the second group of CIS data instead of the first group of CIS data.

5. The PCMCIA card of claim 1, wherein the FPGA is programmed from a computer program executing in the host computer based on an FPGA netlist stored on a disk.

6. The PCMCIA card of claim 1, wherein the FPGA is programmed using two data lines of the PCMCIA connector, wherein one of the data lines is used for a clock signal and a second of the data lines is used for a data signal.

7. A system for configuring a PCMCIA card, comprising:

a host computer including a PCMCIA compatible socket;

a PCMCIA card including a PCMCIA connector;

a nonvolatile memory, coupled to the PCMCIA connector and programmed with a first group of card information structure (CIS) data which defines the PCMCIA card as a memory device and a second group of CIS data which defines the PCMCIA card as an I/O device;

an application-specific circuit which interfaces with a peripheral device; and a field programmable gate array (FPGA) coupled to the PCMCIA connector, to the nonvolatile memory, and to the application specific circuit, wherein the FPGA is programmable through the PCMCIA connector with code which controls the application specific circuit;

wherein the PCMCIA card is operable in a first mode in which the FPGA is programmed using the first group of CIS data through the PCMCIA connector from the host computer, and a second mode in which code programmed into the FPGA is used to operate the PCMCIA card using the second group of CIS data as an I/O device to interact with the peripheral device;

a storage medium on which FPGA instructions are stored; and a computer program executing on the host computer which performs the steps of (1) interacting with the PCMCIA card as a memory device; (2) causing the FPGA instructions to be loaded into the FPGA of the PCMCIA card using memory write instructions; and (3) causing the PCMCIA card to switch into an I/O device mode.

8. The system of claim 7, wherein the PCMCIA card is operated as a tape controller for an external tape unit.

9. The system of claim 7, wherein the FPGA and the application specific circuit are coupled to the periperhal device through an external connector other than the PCMCIA connector.

10. The system of claim 7, wherein the FPGA is programmed using two data lines of the PCMCIA connector, wherein one of the data lines is used for a clock signal and a second of the data lines is used for a data signal.

11. A method of programming a PCMCIA card, comprising the steps of:

(1) from a host computer, reading card information structure (CIS) data from the PCMCIA card and, responsive to reading a first set of CIS data, configuring the host computer to interact with the PCMCIA card as a memory device;

(2) from the host computer, writing FPGA instructions into an FPGA on the PCMCIA card using memory write instructions;

(3) from the host computer, causing the PCMCIA card to switch into an I/O device mode; and (4) from the host computer, interacting with the PCMCIA card as if it were an I/O device.

12. The method of claim 11, wherein step (3) comprises the step of causing a circuit on the PCMCIA card to switch a memory map to refer to a second set of CIS data which indicates that the PCMCIA card is an I/0 device.

13. The method of claim 11, wherein step (2) comprises the step of using one memory data line as a clock signal and a second memory data line as a data signal to program the FPGA on the PCMCIA card.

14. The method of claim 11, wherein step (4) comprises the step of issuing tape controller I/O instructions to the PCMCIA card.

* * * * *